Sept. 8, 1936.  W. H. MANNING  2,053,622
CLUTCH DRIVEN PLATE
Filed July 25, 1935
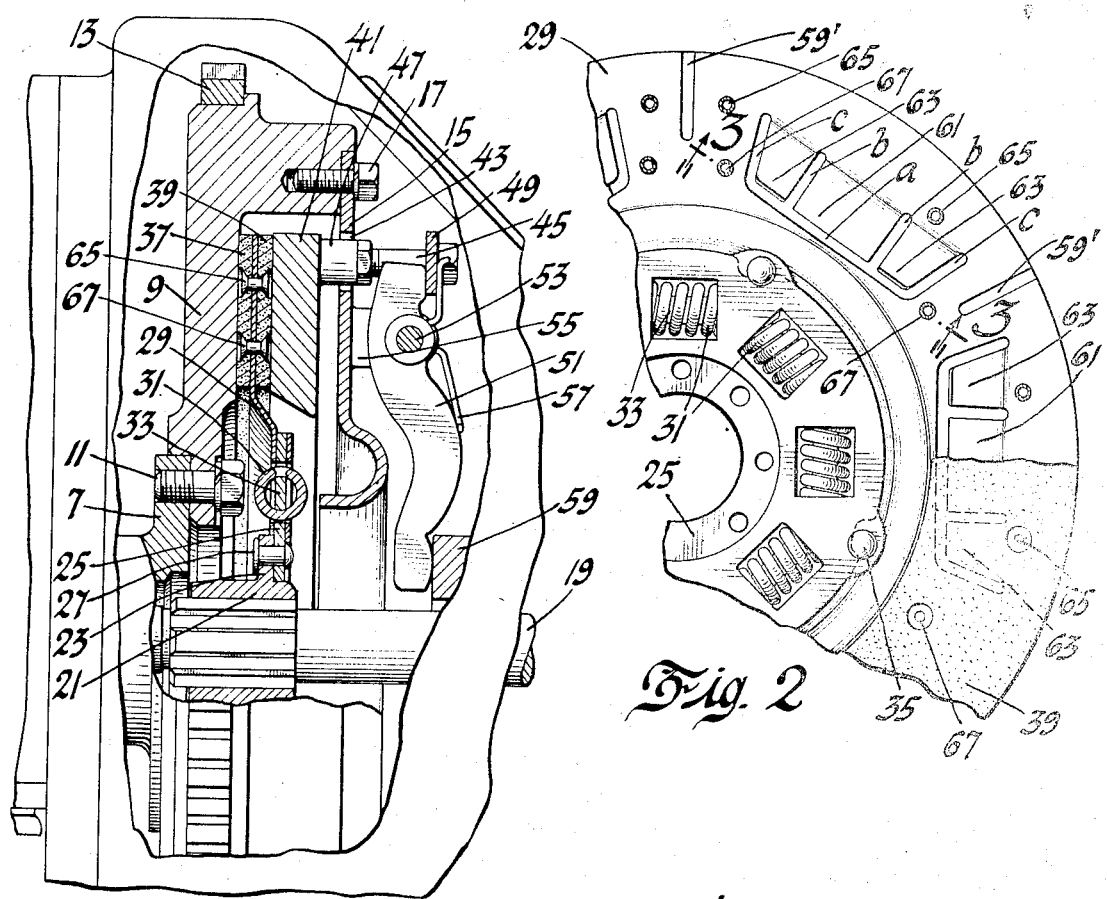
Fig. 1
Fig. 2
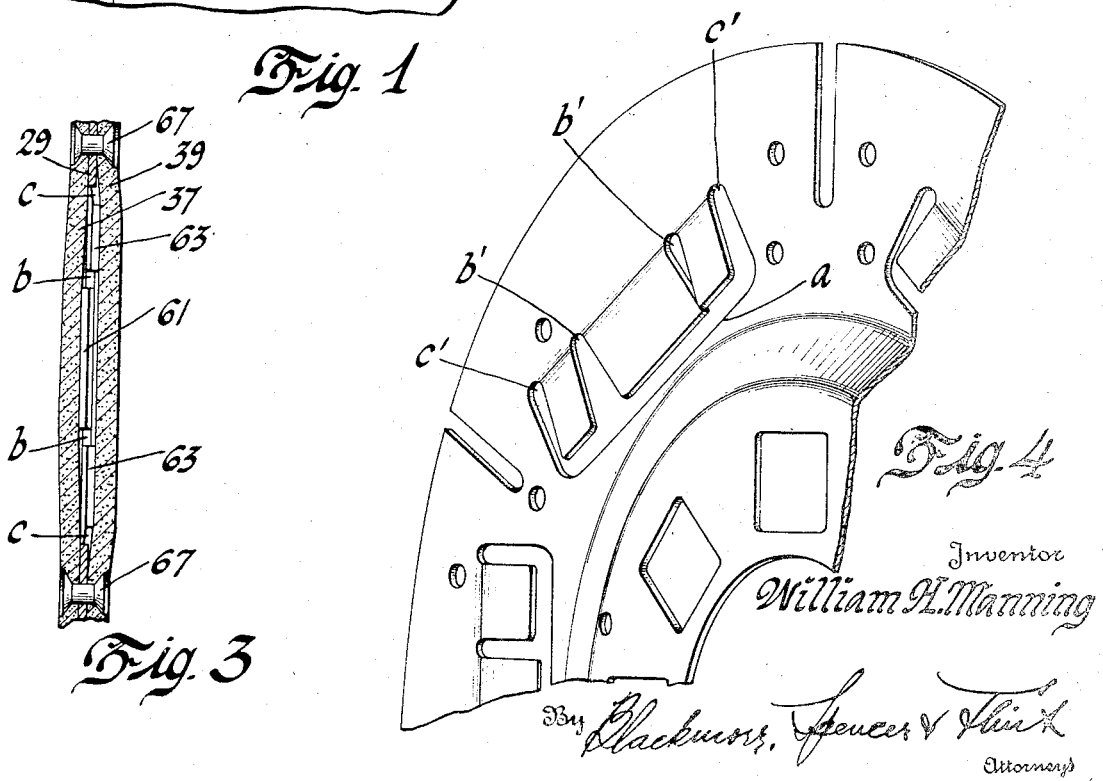
Fig. 3
Fig. 4
Inventor
William H. Manning
By Blackmore, Spencer & Flint
Attorneys Patented Sept. 8, 1936

2,053,622

UNITED STATES PATENT OFFICE 2,053,622

CLUTCH DRIVEN PLATE

William H. Manning, Pontiac, Mich., assignor to General Motors Corporation, Detroit, Mich., a corporation of Delaware Application July 25, 1935, Serial No. 33,010

2 Claims. (Cl. 192—107)

This invention relates to an improvement in a disc clutch and is intended more particularly as a clutch for connecting the engine shaft to the change speed transmission shaft of a motor vehicle.

An object of the invention is to provide for smooth engagement of the clutch elements.

Other objects will be understood from the following description.

The invention is illustrated by an accompanying drawing. On the drawing:

Fig. 1 is a view in longitudinal section.

Fig. 2 is a plan view of the driven plate assembly.

Fig. 3 is a section on line 3—3 of Fig. 2.

Fig. 4 is a perspective of a slight modification of the driven plate.

Referring by reference characters to the drawing, numeral 7 is the flange at the end of the engine shaft and it is secured to the flywheel 9 by fastening means 11. The flywheel carries the toothed ring 13 for engagement with the starter gear, not shown. The flywheel is hollow and to it is secured a cover 15 by fastening means 17. The transmission input shaft 19 carries, non-rotatably, a hub 21 having a flange 23 to which a ring 25 is secured by fastening means 27. A driven plate 29 is centrally apertured to engage the periphery of flange 23 and to engage face to face with ring 25. There are registering openings in the driven plate 29 and hub plate 25 to receive torque resisting springs 31 held by retainers 33. This is a well known construction to permit a slight relative spring resisted rotation between the driven plate 29 and the hub plate. The relative rotation may be limited by pins 35. The driven plate 29 is provided with facings 37 and 39 riveted to its opposite faces, and engaging the inner face of the flywheel and a pressure plate 41.

The cover plate has openings such as 43 for the passage of bosses 47 on the pressure plate 41. To the bosses 47 are secured spaced bolts 45. Under the heads of each pair of adjacent bolts 45 is an abutment 49 to be engaged by the ends of a throw-out finger 51 pivoted at 53 to a cover plate boss 55, an anti-rattling spring being shown at 57. The finger is rocked clockwise by a collar 59 reciprocated by any suitable throw-out device, not shown. It will be understood that the conventional clutch engaging springs are used between the cover plate and the pressure plate but do not appear on the sectional view.

The driven plate has radial slots extending inwardly from its periphery as at 59' defining a plurality of sectors. The several sectors are provided with spring tongues bent from the plane of the plate. In Fig. 2 it will be seen that the plate is cut along a line $a$ at right angles to a radius at the mid-point of its length. Parallel cuts $b$ extend outwardly from line $a$ which lines $b$ are at right angles to line $a$. Terminal lines of cutting marked $c$ extend substantially radially from the ends of line $a$. These lines of cutting form an intermediate tongue 61 and side tongues 63. The tongue 61 is circumferentially elongated as compared with tongues 63 and is bent to one side of the plate and the tongues 63 are both bent to the opposite side of the plate as will be seen by Fig. 3. The line of bending extends substantially along a line joining the outer ends of lines $c$ $c$. It will be observed the circumferential line of rivets 65 secures the facings outwardly of the line of bending and the circumferential line of rivets 67 secures the facings inwardly of the line of bending. Substantially similar tongues 61 and 63 are formed in the several sectors, all the elongated tongues 61 being bent to one side of the plate and all the tongues 63 being bent to the opposite side of the plate.

When the pressure plate moves toward the flywheel face the tongues are forced toward the plane of the plate and by their resiliency provide for a gradual and smooth engagement and avoid the grabby action which might otherwise occur. Cooperating with the torque taking springs 31 the clutch as shown and as above described constitutes a most satisfactory engaging and disengaging means for use between an engine crank shaft and the input shaft of the change speed mechanism of a motor vehicle. Obviously its use is not restricted to this specific relation of parts but may be advantageously assembled between any two instrumentalities having an analogous relation.

Fig. 4 shows a slight modification wherein the four cutting lines $c'$ $b'$ $b'$ $c'$ are substantially parallel and at right angles to line $a$ which corresponds to line $a$ of Fig. 2.

I claim:

1. A driving member and a driven member, a clutch to effect driving engagement between said members and including a driven plate, said plate formed with a plurality of peripheral sectors, each sector having a plurality of tongues, one of which is circumferentially elongated and bent to one side of the plate and others of which are of less length and located one one each side of the elongated tongue and bent to the opposite side of the plate, the elongated tongues of the several sectors all being bent to the same side of the plate.

2. A driving member and a driven member, a clutch to effect driving engagement between said members and including a driven plate, said plate formed with a plurality of peripheral sectors, each sector having a plurality of tongues, one of which is circumferentially elongated and bent to one side of the plate and others of which are of less length and located one on each side of the elongated tongue and bent to the opposite side of the plate, the elongated tongues of the several sectors all being bent to the same side of the plate, together with friction facings on opposite sides of the tongues, and fastening means to secure said facings to the driven plate and located both within and without the line of bending of said tongues.

W. H. MANNING.